United States Patent
Jeong et al.

(10) Patent No.: US 8,823,654 B2
(45) Date of Patent: Sep. 2, 2014

(54) MOBILE TERMINAL AND CONTROLLING METHOD THEREOF

(75) Inventors: Kye Sook Jeong, Seoul (KR); Jung Ok Cho, Seoul (KR); Seung Hyun Yang, Seoul (KR); Hee Young Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 448 days.

(21) Appl. No.: 12/773,791

(22) Filed: May 4, 2010

(65) Prior Publication Data

US 2011/0037710 A1 Feb. 17, 2011

(30) Foreign Application Priority Data

Aug. 11, 2009 (KR) ........................ 10-2009-0073783

(51) Int. Cl.
*G06F 3/041* (2006.01)
(52) U.S. Cl.
USPC ........................................................ 345/173
(58) Field of Classification Search
CPC G06F 3/04817; G11B 19/025; G11B 27/105; G11B 27/34; H04M 1/72522; H04M 1/72558; H04M 2250/22
USPC ............................. 715/863; 345/173; 718/107
See application file for complete search history.

(56) References Cited

U.S. PATENT DOCUMENTS

| 8,082,523 | B2 * | 12/2011 | Forstall et al. | 715/863 |
| 2001/0040571 | A1 * | 11/2001 | Miller | 345/419 |
| 2003/0112279 | A1 | 6/2003 | Irimajiri | |
| 2003/0119562 | A1 | 6/2003 | Kokubo | |
| 2006/0120692 | A1 | 6/2006 | Fukuta | |
| 2006/0288299 | A1 | 12/2006 | Bystricky et al. | |
| 2007/0047909 | A1 | 3/2007 | Toyama et al. | |
| 2007/0101340 | A1 * | 5/2007 | Yoo | 718/107 |
| 2008/0256477 | A1 * | 10/2008 | Cho et al. | 715/772 |
| 2008/0261660 | A1 * | 10/2008 | Huh et al. | 455/566 |
| 2009/0141024 | A1 * | 6/2009 | Lee et al. | 345/420 |
| 2009/0244023 | A1 * | 10/2009 | Kim et al. | 345/173 |
| 2010/0088598 | A1 * | 4/2010 | Lee et al. | 715/704 |
| 2010/0105364 | A1 * | 4/2010 | Yang | 455/414.1 |

FOREIGN PATENT DOCUMENTS

EP 2071145 6/2009

OTHER PUBLICATIONS

Apple Inc., "Apple Human Interface Guidelines—User Experience," Sep. 2008, XP-007906962.
Apple Inc., "iPhone 3G User Manual," Jul. 2008, XP-007907619.
European Patent Office Application Serial No. 10007942.5, Summons to Attend Oral Proceedings dated Mar. 19, 2013, 7 pages.

* cited by examiner

*Primary Examiner* — Quan-Zhen Wang
*Assistant Examiner* — Tony Davis
(74) *Attorney, Agent, or Firm* — Lee, Hong, Degerman, Kang & Waimey

(57) ABSTRACT

A mobile terminal and controlling method thereof are disclosed, which facilitates a terminal to be used in further consideration of user's convenience. According to at least one of embodiments of the present invention, while a first function is being executed in a mobile terminal, if a second function different from the first function is executed, a first function icon having execution progress status information of the first function at a timing point of stopping the execution of the first function can be generated. If the first function is re-executed by selecting the first function icon later, it is advantageous in that the first function can be executed in a manner of being continuous with an execution progress status at the execution stop timing point.

13 Claims, 12 Drawing Sheets

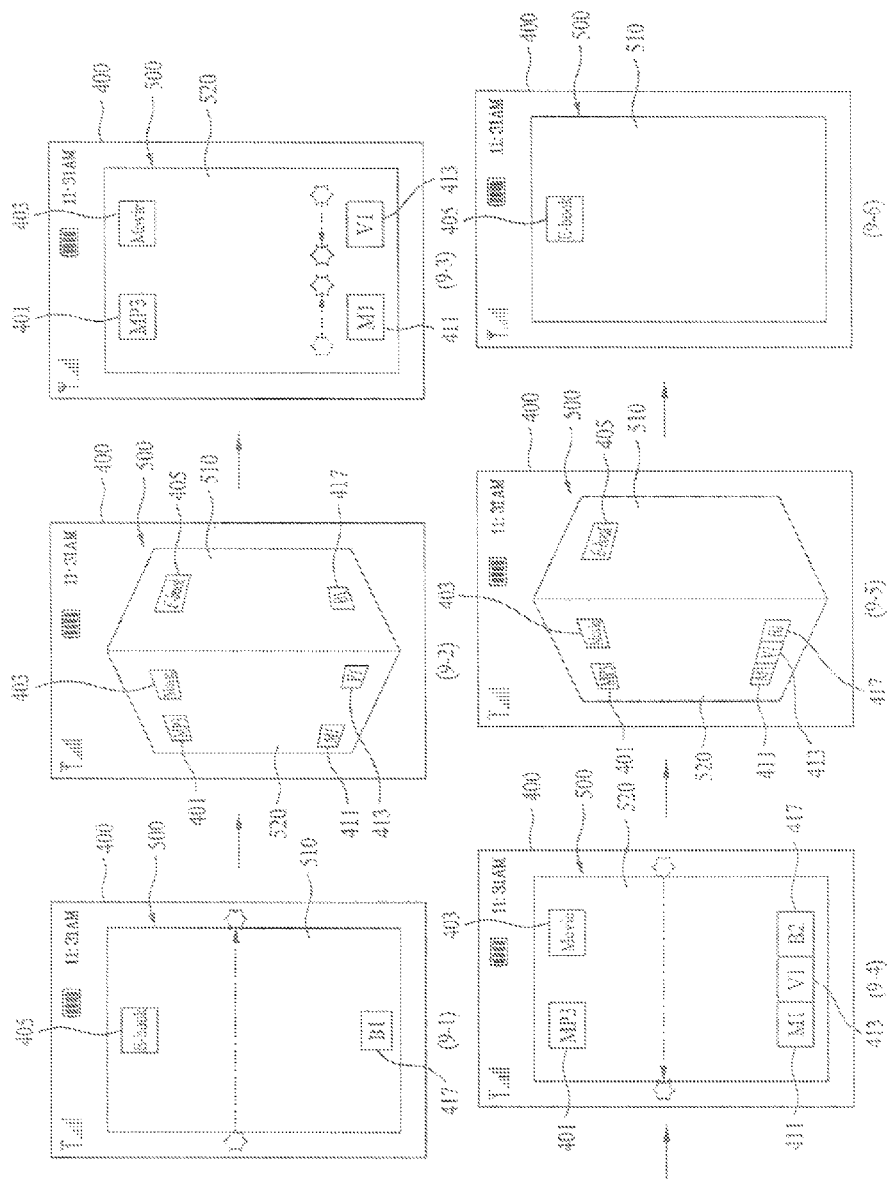

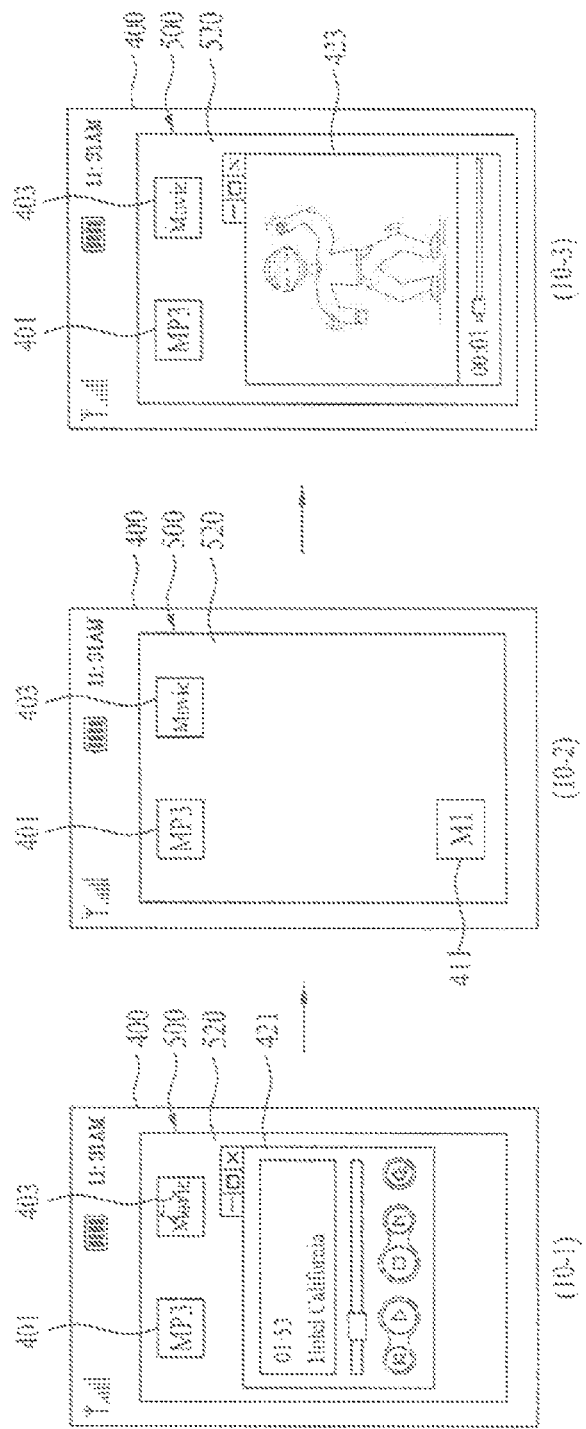

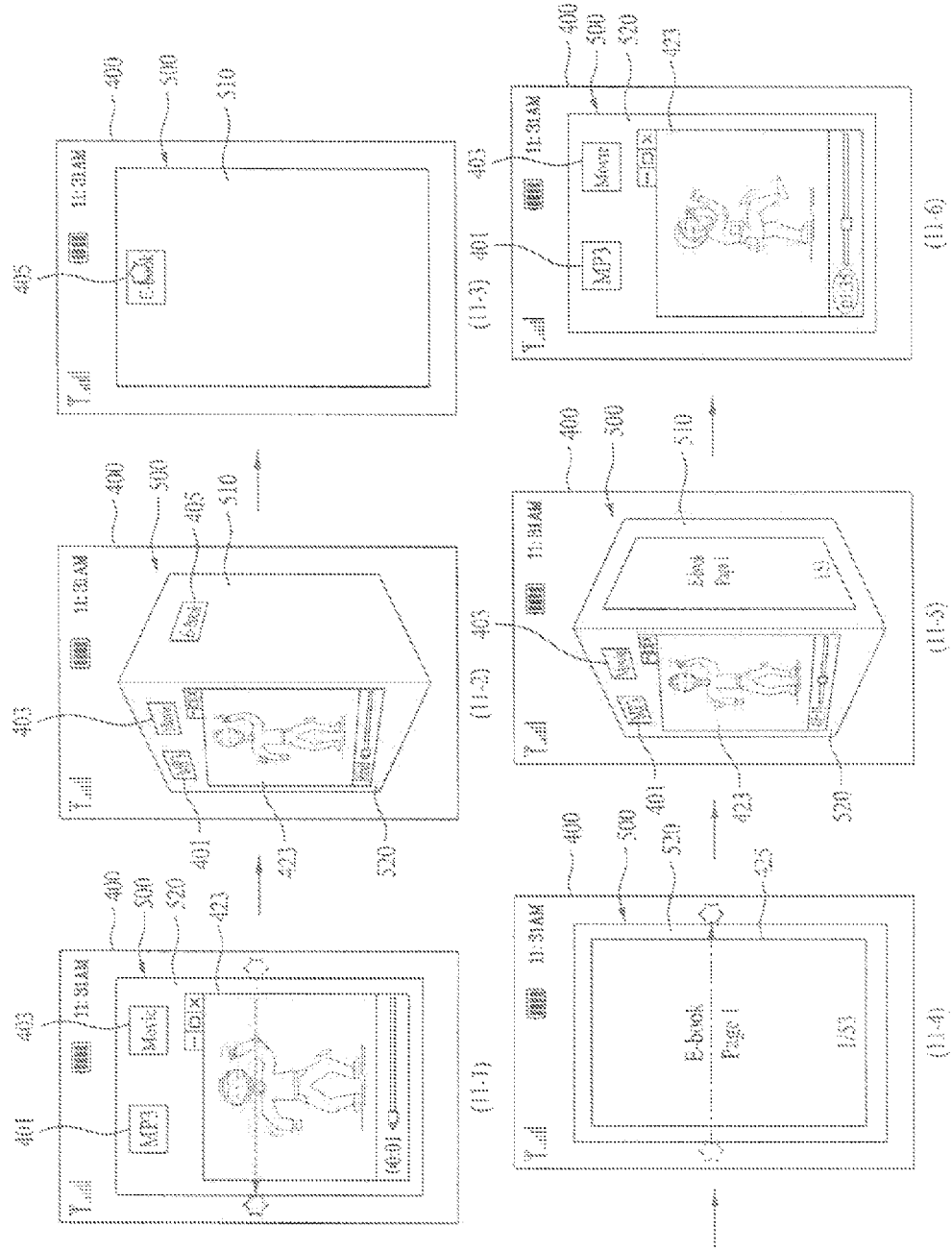

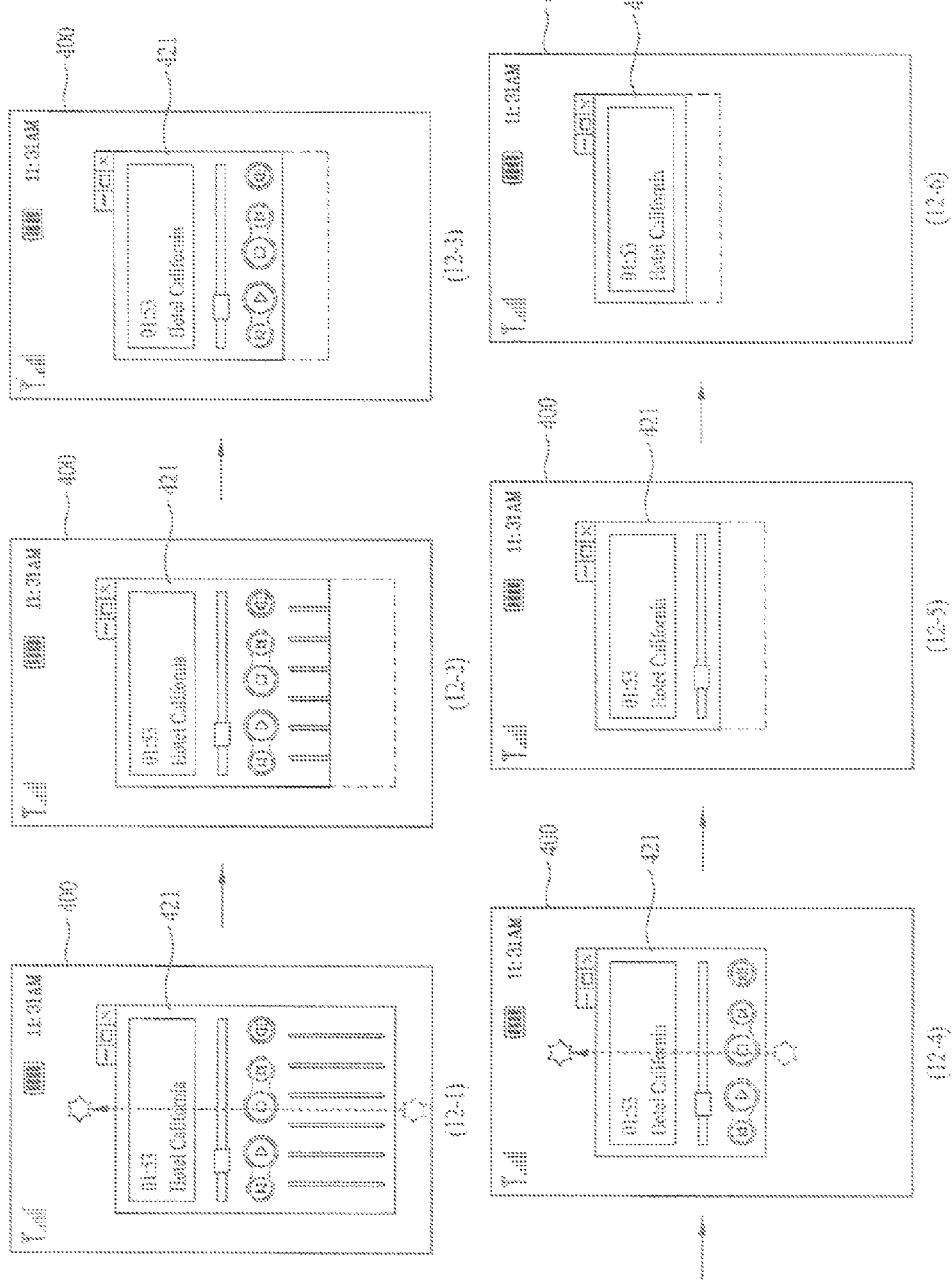

MOBILE TERMINAL AND CONTROLLING METHOD THEREOF

Pursuant to 35 U.S.C. §119(a), this application claims the benefit of earlier filing date and right of priority to Korean Application No. 10-2009-0073783, filed on Aug. 11, 2009, the contents of which are hereby incorporated by reference herein in their entirety.

BACKGROUND OF THE INVENTION

1. Field of the Invention

The present invention relates to a mobile terminal, and more particularly, to a mobile terminal and controlling method thereof. Although the present invention is suitable for a wide scope of applications, it is particularly suitable for facilitating a terminal to be used in further consideration of user's convenience.

2. Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

Recently, mobile terminals capable of performing multi-tasking functionality for executing at least two functions are ongoing to be released.

However, when at least two functions are simultaneously executed in a mobile terminal, the multitasking occasionally fails to be smoothly executed due to the restricted performance of the mobile terminal. Therefore, while one function is being executed in the mobile terminal, if another function is executed, many efforts need to be further made to research and develop how to process the formerly executed function in consideration of terminal user's convenience.

SUMMARY OF THE INVENTION

Accordingly, the present invention is directed to a mobile terminal and controlling method thereof that substantially obviate one or more problems due to limitations and disadvantages of the related art.

An object of the present invention is to provide a mobile terminal and controlling method thereof. While one function is being executed in the mobile terminal, if another function is executed, the present invention enables the formerly executed function to be properly processed in consideration of further enhancement of terminal user's convenience.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a mobile terminal according to the present invention includes a touchscreen, and a controller is configured to, after a first function has been executed such that a first function window is being displayed on the touchscreen, if a second function is newly executed, render the first function window to disappear by stopping the execution of the first function automatically, and display a first function icon having execution progress status information of the first function at an execution stop timing point of the first function on the touchscreen.

In another aspect of the present invention, a method of controlling a mobile terminal according to the present invention includes displaying a first function window on a touchscreen when a first function is executed, newly executing a second function in the course of executing the first function, automatically stopping the execution of the first function, rendering the first function window to disappears, and displaying a first function icon having execution progress status information of the first function at an execution stop timing point of the first function on the touchscreen.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 4 to 12 are diagrams for configurations of a display screen on which a method of controlling a mobile terminal according to an embodiment of the present invention is implemented.

DETAILED DESCRIPTION OF THE INVENTION

Reference will now be made in detail to the preferred embodiments of the present invention, examples of which are illustrated in the accompanying drawings. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or like parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

The present invention can be applicable to a various types of terminals. Examples of such terminals include mobile as well as stationary terminals, such as mobile phones, user equipment, smart phones, DTV, computers, digital broadcast terminals, personal digital assistants, portable multimedia players (PMP) and navigators.

However, by way of non-limiting example only, further description will be with regard to a mobile terminal 100, and it should be noted that such teachings may apply equally to other types of terminals.

Figure 1:
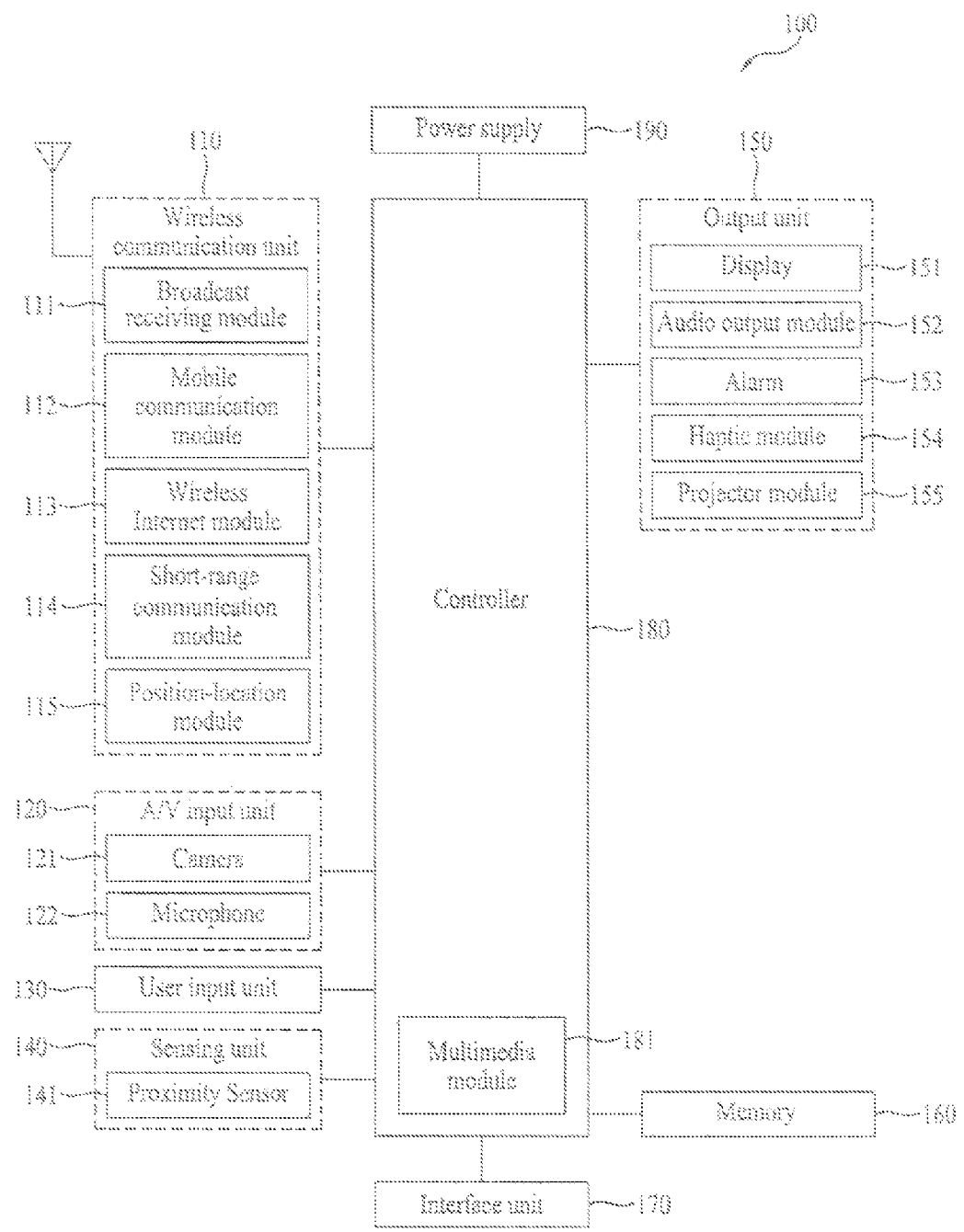
FIG. 1 is a block diagram of a mobile terminal according to one embodiment of the present invention.

FIG. 1 is a block diagram of a mobile terminal 100 in accordance with an embodiment of the present invention. FIG. 1 shows the mobile terminal 100 according to one embodiment of the present invention includes a wireless communication unit 110, an A/V (audio/video) input unit 120, a user input unit 130, a sensing unit 140, an output unit 150, a memory 160, an interface unit 170, a controller 180, a power supply unit 190 and the like. FIG. 1 shows the mobile terminal 100 having various components, but it is understood that implementing all of the illustrated components is not a requirement. Greater or fewer components may alternatively be implemented.

In the following description, the above elements of the mobile terminal 100 are explained in sequence.

First of all, the wireless communication unit 110 typically includes one or more components which permits wireless communication between the mobile terminal 100 and a wireless communication system or network within which the mobile terminal 100 is located. For instance, the wireless communication unit 110 can include a broadcast receiving module 111, a mobile communication module 112, a wireless internet module 113, a short-range communication module 114, a position-location module 115 and the like.

The broadcast receiving module 111 receives a broadcast signal and/or broadcast associated information from an external broadcast managing server via a broadcast channel.

The broadcast channel may include a satellite channel and a terrestrial channel.

The broadcast managing server generally refers to a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and a data broadcast signal, among others. If desired, the broadcast signal may further include a broadcast signal combined with a TV or radio broadcast signal.

At least two broadcast receiving modules 111 can be provided to the mobile terminal 100 in pursuit of simultaneous receptions of at least two broadcast channels or broadcast channel switching facilitation.

The broadcast associated information includes information associated with a broadcast channel, a broadcast program, a broadcast service provider, etc. And, the broadcast associated information can be provided via a mobile communication network. In this case, the broadcast associated information can be received by the mobile communication module 112.

The broadcast associated information can be implemented in various forms. For instance, broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), DVB-CBMS, OMA-BCAST, the data broadcasting system known as media forward link only (MediaFLO®) and integrated services digital broadcast-terrestrial (ISDB-T). Optionally, the broadcast receiving module 111 can be configured suitable for other broadcasting systems as well as the above-explained digital broadcasting systems.

The broadcast signal and/or broadcast associated information received by the broadcast receiving module 111 may be stored in a suitable device, such as a memory 160.

The mobile communication module 112 transmits/receives wireless signals to/from one or more network entities (e.g., base station, external terminal, server, etc.). Such wireless signals may represent audio, video, and data according to text/multimedia message transceivings, among others.

The wireless internet module 113 supports Internet access for the mobile terminal 100. This module may be internally or externally coupled to the mobile terminal 100. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 facilitates relatively short-range communications. Suitable technologies for implementing this module include radio frequency identification (RFID), infrared data association (IrDA), ultra-wideband (UWB), as well at the networking technologies commonly referred to as Bluetooth and ZigBee, to name a few.

The position-location module 115 identifies or otherwise obtains the location of the mobile terminal 100. If desired, this module may be implemented with a global positioning system (GPS) module.

Referring to FIG. 1, the audio/video (A/V) input unit 120 is configured to provide audio or video signal input to the mobile terminal 100. As shown, the A/V input unit 120 includes a camera 121 and a microphone 122. The camera 121 receives and processes image frames of still pictures or video, which are obtained by an image sensor in a video call mode or a photographing mode. And, the processed image frames can be displayed on the display 151.

The image frames processed by the camera 121 can be stored in the memory 160 or can be externally transmitted via the wireless communication unit 110. Optionally, at least two cameras 121 can be provided to the mobile terminal 100 according to environment of usage.

The microphone 122 receives an external audio signal while the portable device is in a particular mode, such as phone call mode, recording mode and voice recognition. This audio signal is processed and converted into electric audio data. The processed audio data is transformed into a format transmittable to a mobile communication base station via the mobile communication module 112 in case of a call mode. The microphone 122 typically includes assorted noise removing algorithms to remove noise generated in the course of receiving the external audio signal.

The user input unit 130 generates input data responsive to user manipulation of an associated input device or devices.

Examples of such devices include a keypad, a dome switch, a touchpad (e.g., static pressure/capacitance), a jog wheel, a jog switch, etc.

The sensing unit 140 provides sensing signals for controlling operations of the mobile terminal 100 using status measurements of various aspects of the mobile terminal. For instance, the sensing unit 140 may detect an open/close status of the mobile terminal 100, relative positioning of components (e.g., a display and keypad) of the mobile terminal 100, a change of position of the mobile terminal 100 or a component of the mobile terminal 100, a presence or absence of user contact with the mobile terminal 100, orientation or acceleration/deceleration of the mobile terminal 100. As an example, consider the mobile terminal 100 being configured as a slide-type mobile terminal. In this configuration, the sensing unit 140 may sense whether a sliding portion of the mobile terminal is open or closed. Other examples include the sensing unit 140 sensing the presence or absence of power provided by the power supply 190, the presence or absence of a coupling or other connection between the interface unit 170 and an external device. And, the sensing unit 140 can include a proximity sensor 141.

The output unit 150 generates outputs relevant to the senses of sight, hearing, touch and the like. And, the output unit 150 includes the display 151, an audio output module 152, an alarm unit 153, a haptic module 154, a projector module 155 and the like.

The display 151 is typically implemented to visually display (output) information associated with the mobile terminal 100. For instance, if the mobile terminal is operating in a phone call mode, the display will generally provide a user interface (UI) or graphical user interface (GUI) which includes information associated with placing, conducting, and terminating a phone call. As another example, if the mobile terminal 100 is in a video call mode or a photographing mode, the display 151 may additionally or alternatively display images which are associated with these modes, the UI or the GUI.

The display module 151 may be implemented using known display technologies including, for example, a liquid crystal display (LCD), a thin film transistor-liquid crystal display (TFT-LCD), an organic light-emitting diode display (OLED), a flexible display and a three-dimensional display. The mobile terminal 100 may include one or more of such displays.

Some of the above displays can be implemented in a transparent or optical transmittive type, which can be named a transparent display. As a representative example for the transparent display, there is TOLED (transparent OLED) or the like. A rear configuration of the display 151 can be implemented in the optical transmittive type as well. In this configuration, a user is able to see an object in rear of a terminal body via the area occupied by the display 151 of the terminal body.

At least two displays 151 can be provided to the mobile terminal 100 in accordance with the implemented configuration of the mobile terminal 100. For instance, a plurality of displays can be arranged on a single face of the mobile terminal 100 in a manner of being spaced apart from each other or being built in one body. Alternatively, a plurality of displays can be arranged on different faces of the mobile terminal 100.

In case that the display 151 and a sensor for detecting a touch action (hereinafter called 'touch sensor') configures a mutual layer structure (hereinafter called 'touchscreen'), it is able to use the display 151 as an input device as well as an output device. In this case, the touch sensor can be configured as a touch film, a touch sheet, a touchpad or the like.

The touch sensor can be configured to convert a pressure applied to a specific portion of the display 151 or a variation of a capacitance generated from a specific portion of the display 151 to an electric input signal. Moreover, it is able to configure the touch sensor to detect a pressure of a touch as well as a touched position or size.

If a touch input is made to the touch sensor, signal(s) corresponding to the touch is transferred to a touch controller. The touch controller processes the signal(s) and then transfers the processed signal(s) to the controller 180. Therefore, the controller 180 is able to know whether a prescribed portion of the display 151 is touched.

Referring to FIG. 1, a proximity sensor (not shown in the drawing) can be provided to an internal area of the mobile terminal 100 enclosed by the touchscreen or around the touchscreen. The proximity sensor is the sensor that detects a presence or non-presence of an object approaching a prescribed detecting surface or an object existing around the proximity sensor using an electromagnetic field strength or infrared ray without mechanical contact. Hence, the proximity sensor has durability longer than that of a contact type sensor and also has utility wider than that of the contact type sensor.

The proximity sensor can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. In case that the touchscreen includes the electrostatic capacity proximity sensor, it is configured to detect the proximity of a pointer using a variation of electric field according to the proximity of the pointer. In this case, the touchscreen (touch sensor) can be classified as the proximity sensor.

In the following description, for clarity, an action that a pointer approaches without contacting with the touchscreen to be recognized as located on the touchscreen is named 'proximity touch'. And, an action that a pointer actually touches the touchscreen is named 'contact touch'. The meaning of the position on the touchscreen proximity-touched by the pointer means the position of the pointer which vertically opposes the touchscreen when the pointer performs the proximity touch.

The proximity sensor detects a proximity touch and a proximity touch pattern (e.g., a proximity touch distance, a proximity touch duration, a proximity touch position, a proximity touch shift state, etc.). And, information corresponding to the detected proximity touch action and the detected proximity touch pattern can be outputted to the touchscreen.

The audio output module 152 functions in various modes including a call-receiving mode, a call-placing mode, a recording mode, a voice recognition mode, a broadcast reception mode and the like to output audio data which is received from the wireless communication unit 110 or is stored in the memory 160. During operation, the audio output module 152 outputs audio relating to a particular function (e.g., call received, message received, etc.). The audio output module 152 is often implemented using one or more speakers, buzzers, other audio producing devices, and combinations thereof.

The alarm unit 153 is output a signal for announcing the occurrence of a particular event associated with the mobile terminal 100. Typical events include a call received event, a message received event and a touch input received event. The alarm unit 153 is able to output a signal for announcing the event occurrence by way of vibration as well as video or audio signal. The video or audio signal can be outputted via the display 151 or the audio output unit 152. Hence, the display 151 or the audio output module 152 can be regarded as a part of the alarm unit 153.

The haptic module 154 generates various tactile effects that can be sensed by a user. Vibration is a representative one of the tactile effects generated by the haptic module 154. Strength and pattern of the vibration generated by the haptic module 154 are controllable. For instance, different vibrations can be outputted in a manner of being synthesized together or can be outputted in sequence.

The haptic module 154 is able to generate various tactile effects as well as the vibration. For instance, the haptic module 154 generates the effect attributed to the arrangement of pins vertically moving against a contact skin surface, the effect attributed to the injection/suction power of air though an injection/suction hole, the effect attributed to the skim over a skin surface, the effect attributed to the contact with electrode, the effect attributed to the electrostatic force, the effect attributed to the representation of hold/cold sense using an endothermic or exothermic device and the like.

The haptic module 154 can be implemented to enable a user to sense the tactile effect through a muscle sense of finger, arm or the like as well as to transfer the tactile effect through a direct contact. Optionally, at least two haptic modules 154 can be provided to the mobile terminal 100 in accordance with the corresponding configuration type of the mobile terminal 100.

The projector module 155 is the element for performing an image projector function using the mobile terminal 100. And, the projector module 155 is able to display an image, which is identical to or partially different at least from the image displayed on the display 151, on an external screen or wall according to a control signal of the controller 180.

In particular, the projector module 155 can include a light source (not shown in the drawing) generating light (e.g., laser) for projecting an image externally, an image producing means (not shown in the drawing) for producing an image to output externally using the light generated from the light source, and a lens (not shown in the drawing) for enlarging to output the image externally in a predetermined focus distance. And, the projector module 155 can further include a device (not shown in the drawing) for adjusting an image projected direction by mechanically moving the lens or the whole module.

The projector module 155 can be classified into a CRT (cathode ray tube) module, an LCD (liquid crystal display) module, a DLP (digital light processing) module or the like according to a device type of a display means. In particular, the DLP module is operated by the mechanism of enabling the light generated from the light source to reflect on a DMD (digital micro-mirror device) chip and can be advantageous for the downsizing of the projector module 151.

Preferably, the projector module 155 can be provided in a length direction of a lateral, front or backside direction of the mobile terminal 100. And, it is understood that the projector module 155 can be provided to any portion of the mobile terminal 100 according to the necessity thereof.

The memory unit 160 is generally used to store various types of data to support the processing, control, and storage requirements of the mobile terminal 100. Examples of such data include program instructions for applications operating on the mobile terminal 100, contact data, phonebook data, messages, audio, still pictures, moving pictures, etc. And, a recent use history or a cumulative use frequency of each data (e.g., use frequency for each phonebook, each message or each multimedia) can be stored in the memory unit 160.

Moreover, data for various patterns of vibration and/or sound outputted in case of a touch input to the touchscreen can be stored in the memory unit 160.

In the memory 160, data about touch gestures, which respectively correspond to prescribed execution functions, can be further stored. Therefore, if one touch gesture is performed on the touchscreen, one of the prescribed functions corresponding to the touch gesture can be executed in the mobile terminal 100.

The memory 160 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory, XD memory, etc.), or other similar memory or data storage device. And, the mobile terminal 100 is able to operate in association with a web storage for performing a storage function of the memory 160 on Internet.

The interface unit 170 is often implemented to couple the mobile terminal 100 with external devices. The interface unit 170 receives data from the external devices or is supplied with the power and then transfers the data or power to the respective elements of the mobile terminal 100 or enables data within the mobile terminal 100 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module is the chip for storing various kinds of information for authenticating a use authority of the mobile terminal 100 and can include User Identify Module (UIM), Subscriber Identify Module (SIM), Universal Subscriber Identity Module (USIM) and/or the like. A device having the identity module (hereinafter called 'identity device') can be manufactured as a smart card. Therefore, the identity device is connectible to the mobile terminal 100 via the corresponding port.

When the mobile terminal 110 is connected to an external cradle, the interface unit 170 becomes a passage for supplying the mobile terminal 100 with a power from the cradle or a passage for delivering various command signals inputted from the cradle by a user to the mobile terminal 100. Each of the various command signals inputted from the cradle or the power can operate as a signal enabling the mobile terminal 100 to recognize that it is correctly loaded in the cradle.

The controller 180 typically controls the overall operations of the mobile terminal 100. For example, the controller 180 performs the control and processing associated with voice calls, data communications, video calls, etc. The controller 180 may include a multimedia module 181 that provides multimedia playback. The multimedia module 181 may be configured as part of the controller 180, or implemented as a separate component.

Moreover, the controller 180 is able to perform a pattern recognizing process for recognizing a writing input and a picture drawing input carried out on the touchscreen as characters or images, respectively.

The power supply unit 190 provides power required by the various components for the mobile terminal 100. The power may be internal power, external power, or combinations thereof.

Various embodiments described herein may be implemented in a computer-readable medium using, for example, computer software, hardware, or some combination thereof. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory such as the memory 160, and executed by a controller or processor, such as the controller 180.

Figure 2A:
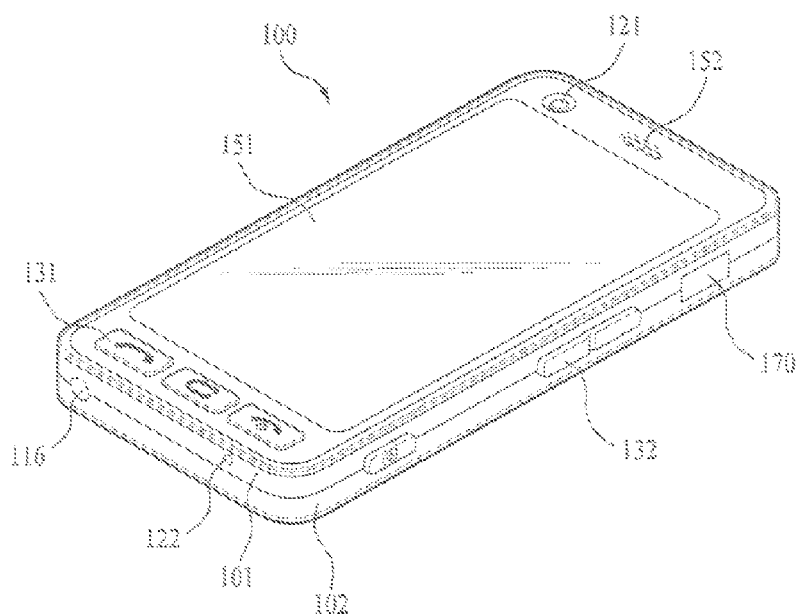
FIG. 2A is a front perspective diagram of a mobile terminal according to one embodiment of the present invention.

FIG. 2A is a front perspective diagram of a mobile terminal according to one embodiment of the present invention.

The mobile terminal 100 shown in the drawing has a bar type terminal body. Yet, the mobile terminal 100 may be implemented in a variety of different configurations. Examples of such configurations include folder-type, slide-type, rotational-type, swing-type and combinations thereof. For clarity, further disclosure will primarily relate to a bar-type mobile terminal 100. However such teachings apply equally to other types of mobile terminals.

Referring to FIG. 2A, the mobile terminal 100 includes a case (casing, housing, cover, etc.) configuring an exterior thereof. In the present embodiment, the case can be divided into a front case 101 and a rear case 102. Various electric/electronic parts are loaded in a space provided between the front and rear cases 101 and 102. Optionally, at least one middle case can be further provided between the front and rear cases 101 and 102 in addition.

The cases 101 and 102 are formed by injection molding of synthetic resin or can be formed of metal substance such as stainless steel (STS), titanium (Ti) or the like for example.

A display 151, an audio output unit 152, a camera 121, user input units 130/131 and 132, a microphone 122, an interface 180 and the like can be provided to the terminal body, and more particularly, to the front case 101.

The display 151 occupies most of a main face of the front case 101. The audio output unit 151 and the camera 121 are provided to an area adjacent to one of both end portions of the display 151, while the user input unit 131 and the microphone 122 are provided to another area adjacent to the other end portion of the display 151. The user input unit 132 and the interface 170 can be provided to lateral sides of the front and rear cases 101 and 102.

The input unit 130 is manipulated to receive a command for controlling an operation of the terminal 100. And, the input unit 130 is able to include a plurality of manipulating units 131 and 132. The manipulating units 131 and 132 can be named a manipulating portion and may adopt any mechanism of a tactile manner that enables a user to perform a manipulation action by experiencing a tactile feeling.

Content inputted by the first or second manipulating unit 131 or 132 can be diversely set. For instance, such a command as start, end, scroll and the like is inputted to the first manipulating unit 131. And, a command for a volume adjustment of sound outputted from the audio output unit 152, a command for a switching to a touch recognizing mode of the display 151 or the like can be inputted to the second manipulating unit 132.

Figure 2B:
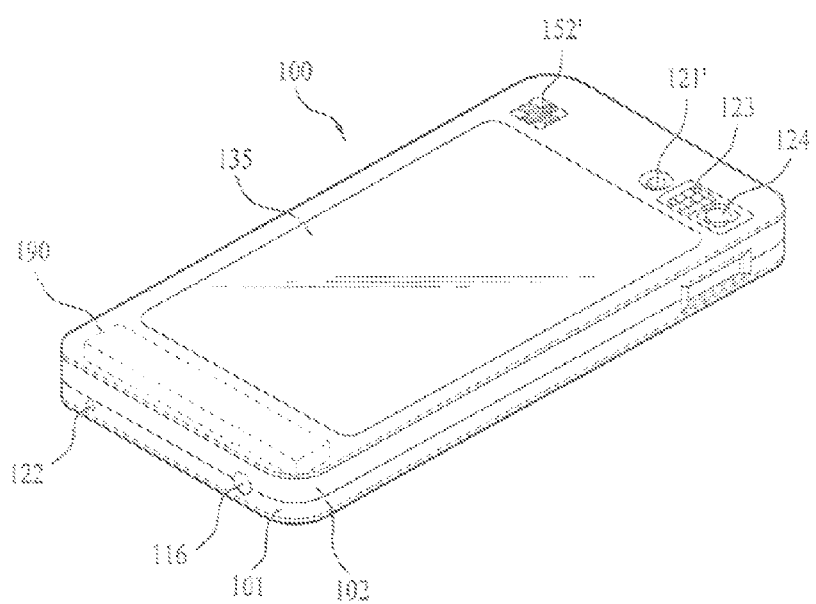
FIG. 2B is a rear perspective diagram of a mobile terminal according to one embodiment of the present invention.

FIG. 2B is a perspective diagram of a backside of the terminal shown in FIG. 2A.

Referring to FIG. 2B, a camera 121' can be additionally provided to a backside of the terminal body, and more particularly, to the rear case 102. The camera 121 has a photographing direction that is substantially opposite to that of the former camera 121 shown in FIG. 21A and may have pixels differing from those of the firmer camera 121.

Preferably, for instance, the former camera 121 has low pixels enough to capture and transmit a picture of user's face for a video call, while the latter camera 121' has high pixels for capturing a general subject for photography without transmitting the captured subject. And, each of the cameras 121 and 121' can be installed at the terminal body to be rotated or popped up.

A flash 123 and a mirror 124 are additionally provided adjacent to the camera 121'. The flash 123 projects light toward a subject in case of photographing the subject using the camera 121'. In case that a user attempts to take a picture of the user (self-photography) using the camera 121', the mirror 124 enables the user to view user's face reflected by the mirror 124.

An additional audio output unit 152' can be provided to the backside of the terminal body. The additional audio output unit 152' is able to implement a stereo function together with the former audio output unit 152 shown in FIG. 2A and may be used for implementation of a speakerphone mode in talking over the terminal.

A broadcast signal receiving antenna 124 can be additionally provided to the lateral side of the terminal body as well as an antenna for communication or the like. The antenna 124 constructing a portion of the broadcast receiving module 111 shown in FIG. 1 can be retractably provided to the terminal body.

A power supply unit 190 for supplying a power to the terminal 100 is provided to the terminal body. And, the power supply unit 190 can be configured to be built within the terminal body. Alternatively, the power supply unit 190 can be configured to be detachably connected to the terminal body.

A touchpad 135 for detecting a touch can be additionally provided to the rear case 102. The touchpad 135 can be configured in a light transmittive type like the display 151. In this case, if the display 151 is configured to output visual information from its both faces, it is able to recognize the visual information via the touchpad 135 as well. The information outputted from both of the faces can be entirely controlled by the touchpad 135. Alternatively, a display is further provided to the touchpad 135 so that a touchscreen can be provided to the rear case 102 as well.

The touchpad 135 is activated by interconnecting with the display 151 of the front case 101. The touchpad 135 can be provided in rear of the display 151 in parallel. The touchpad 135 can have a size equal to or smaller than that of the display 151.

In the following description, embodiments related to a controlling method, which can be implemented in the mobile terminal 100, are explained with reference to the accompanying drawings.

If the display module 151 includes a touchscreen, implementation of the following embodiment is further facilitated. Therefore, the following description is made on the assumption that the display module 151 includes a touchscreen. And, a display screen of the touchscreen 151 is indicated by a reference number 400 in the following description.

Figure 3:
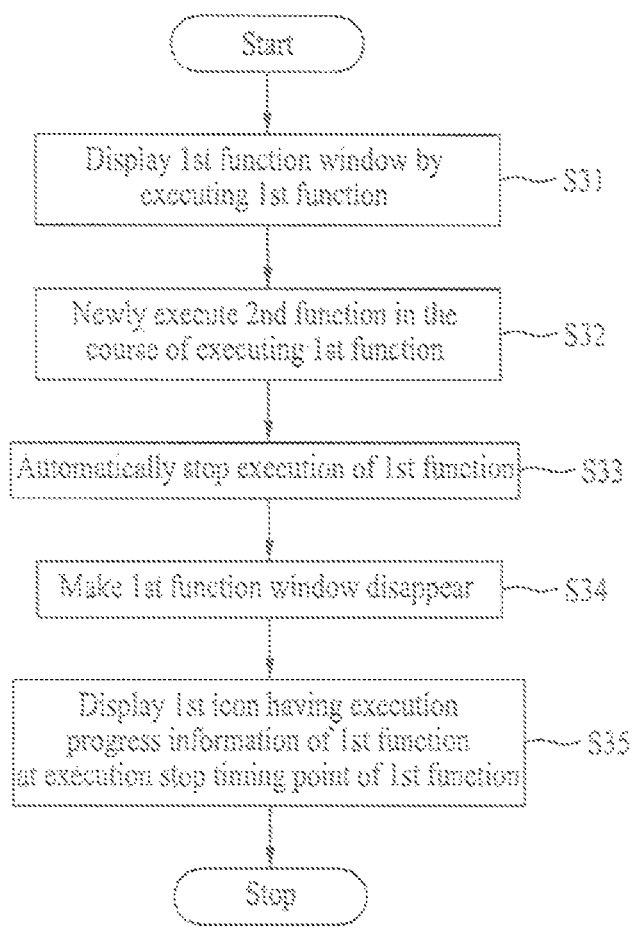
FIG. 3 is a flowchart for a method of controlling a mobile terminal according to an embodiment of the present invention.

FIG. 3 is a flowchart for a method of controlling a mobile terminal according to an embodiment of the present invention, and FIGS. 4 to 12 are diagrams for configurations of a display screen on which a method of controlling a mobile terminal according to an embodiment of the present invention is implemented.

Figure 4:
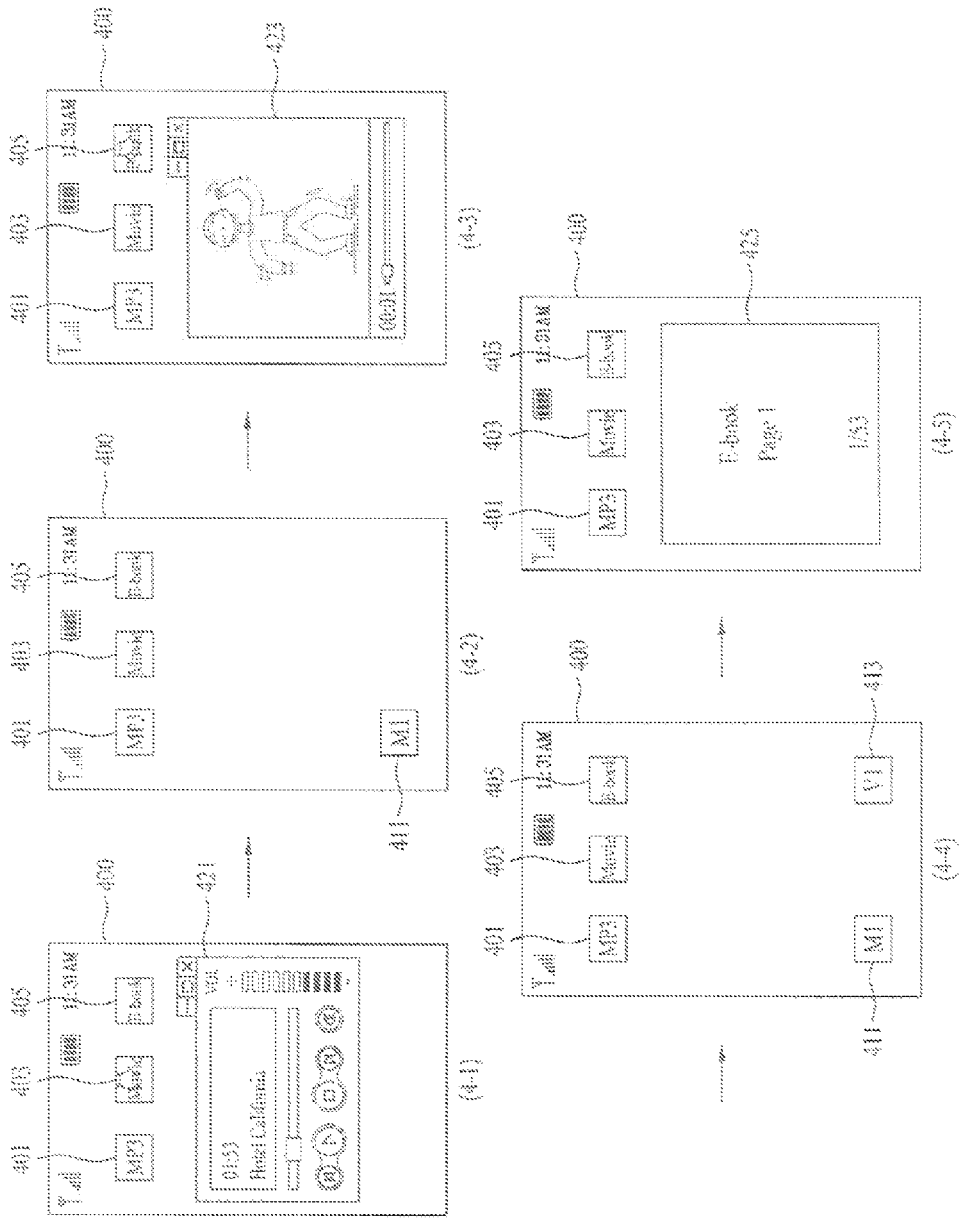

Referring to (4-1) of FIG. 4, the mobile terminal 100 is executing an audio play function for playing such audio as music while an audio play window 421 is being displayed on the touchscreen 400 [S31]. An audio menu icon 401, a video menu icon 403 and an e-book menu icon 405 are exemplarily displayed on the touchscreen 400. According to the present embodiment, it is not mandatory for the menu icons 401, 403 and 405 to be displayed. Optionally, another menu icon is added to the menu icons 401, 403 and 405 with or without replacing at least one of the menu icons 401, 403 and 405.

It is able to configure the audio play function to be executed by touching the audio menu icon 401. Alternatively, it is able to execute the audio play function through a proper manipulation of the user input unit 130 instead of touching the audio menu icon 401. In this alternative case, the audio menu icon 401 may not be displayed on the touchscreen 400. This mechanism is applicable to other menu icons.

Subsequently, in order to execute another menu (e.g., a video menu) in the course of executing the audio play function, the video menu icon 403 is touched for example [S32].

If so, referring to (4-2) of FIG. 4, the audio play function is stopped in the mobile terminal 100 [S33].

The audio play function window 421 disappears from the touchscreen 400 [S34].

Execution progress status information of the audio play function at a timing point of newly executing the video menu, i.e., at the timing point of stopping the execution of the audio play function can be stored in the memory 160. An audio play function icon 411 linked to the execution progress status information is generated and then displayed on the touchscreen 400 [S35]. In this following description, 'linking the audio play function icon 411 to the execution progress status information' may be represented in a manner that the audio play function icon 411 is provided with the execution progress status information.

In this case, the execution progress status information can include an audio file name, which was being played at the timing point of stopping the execution of the audio play function, the corresponding play stop time (e.g., 1 minute 53 seconds) and the like. Therefore, by referring to the execution progress status information, if the audio play function is re-executed later, it is able to play back the audio file continuous with the execution progress status at the execution stopped timing point. In particular, it is able to play back the audio file, which was paused in the course of playback, continuously from the play stop time. This shall be explained later.

Referring to (4-3) of FIG. 4, a video play window 423 is displayed on the touchscreen 400 and the video play function is executed.

Optionally, the disappearance of the audio play window, the generation of the audio play function icon and the execution of the video play function according to the displayed video play window are performed in random order or can be performed at the same time substantially.

Referring to (4-3) of FIG. 4, the e-book menu icon 405 is selected by being touched.

If so, referring to (4-4) of FIG. 4, the video play function is stopped in the mobile terminal 100. The video play function window 423 then disappears from the touchscreen 400.

Execution progress status information of the video play function at a timing point of newly executing the e-book menu, i.e., at the timing point of stopping the execution of the video play function can be stored in the memory 160. A video play function icon 413 linked to the execution progress status information is generated and then displayed on the touchscreen 400. The execution progress status information of the video play function icon 413 is similar to that of the audio play function icon 411.

The execution progress status information of the video play function icon 413 can include a video file name, which was being played at the timing point of stopping the execution of the video play function, the corresponding play stop time and the like. Therefore, by referring to the execution progress status information, if the video play function is re-executed later, it is able to play back the video file continuous with the play stop time. This shall be explained later.

Referring to (4-5) of FIG. 4, an e-book viewer window 423 is displayed on the touchscreen 400 and an e-book viewer function is executed.

In the following description, the audio play function icon 411 is explained in detail with reference to FIG. 5.

Figure 5:
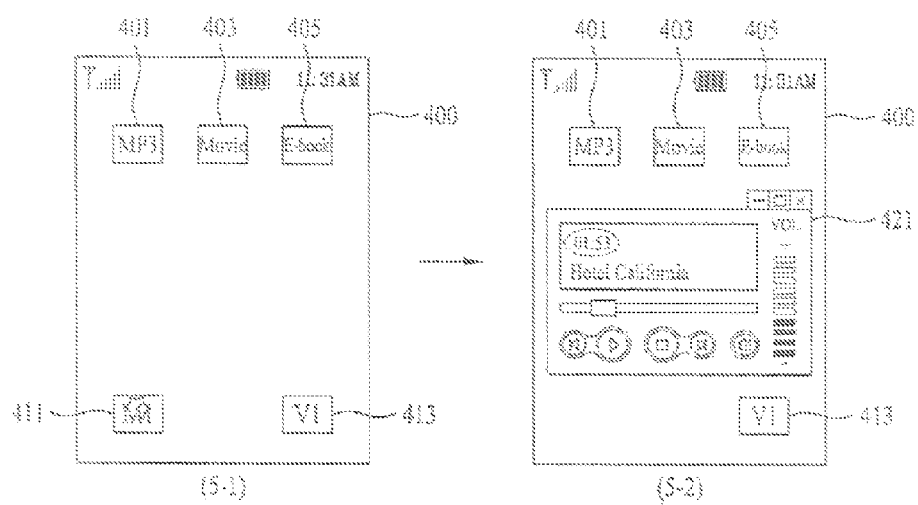

Referring to (5-1) of FIG. 5, the audio play function icon 411 and the video play function icon 413 are displayed on the touchscreen 400.

The audio play function icon 411 is selected by being touched.

If so, referring to (5-2) of FIG. 5, the controller 180 plays a corresponding audio file (i.e., an audio file stopped in the course of playback) continuous from a corresponding play stop time (e.g., 1 minute 53 seconds) by referring to the execution progress status information corresponding to the audio play function icon 411.

In the above description, the audio play function icon 411 and the video play function icon 413 are described. Regarding the audio play function, at least two audio icons can be generated as well as one audio play function icon. This is explained in detail with reference to FIG. 6 as follows.

Figure 6:
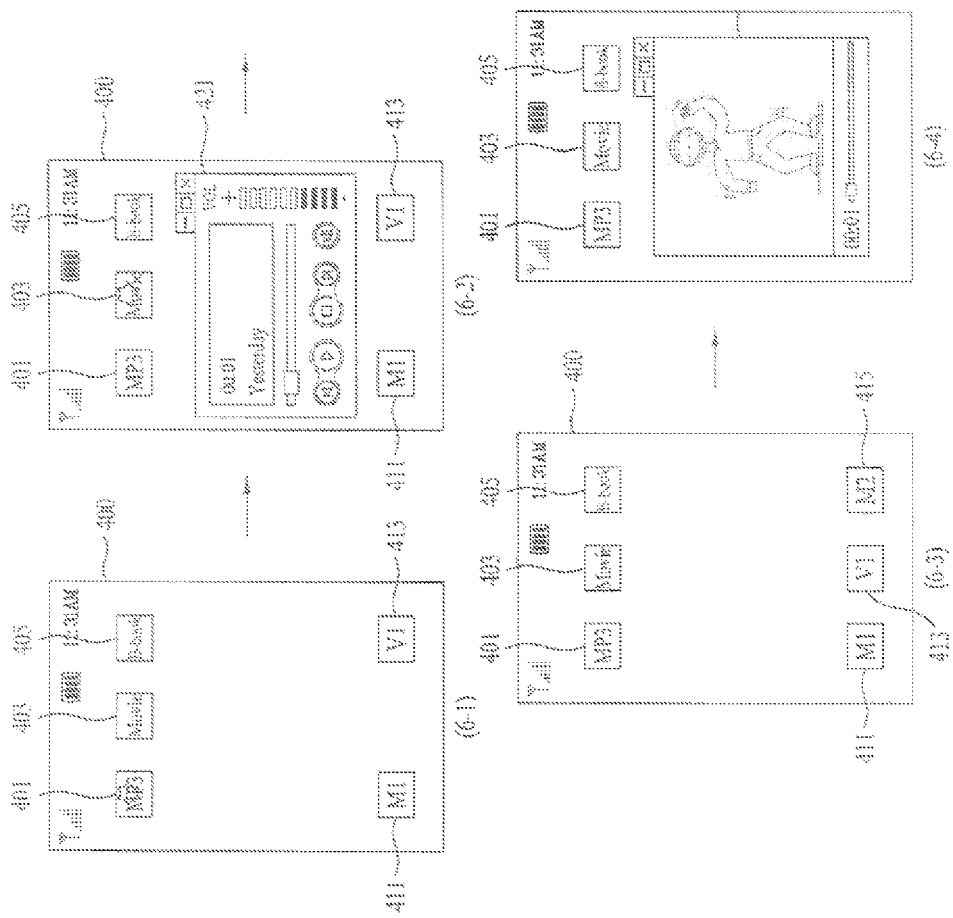

Referring to (6-1) of FIG. 6, the audio menu icon 401, the video menu icon 403 and the e-book menu icon 405 are exemplarily displayed on the touchscreen 400. The audio play function icon 411 and the video play function icon 413 are displayed on the touchscreen 400. The processes for generating the audio and video play function icons 411 and 413 are explained in the foregoing description, of which details are omitted from the following description for clarity of this disclosure.

In order to discriminate the audio play function icon 411 from another audio play function icon 415 newly generated in the following description, the audio play function icon 411 shall be named a first audio play function icon 411. The audio file related to the first audio play function icon 411 shall be named a first audio file to be discriminated from other audio files explained in the following description.

Subsequently, if the audio menu icon 401 is touched and selected, referring to (6-2) of FIG. 6, the audio play function is executed in the mobile terminal 100 and the audio play window 421 is displayed on the touchscreen 400. A second audio file different from the first audio file is selected via the audio play window 421 and can be then executed. This is apparent to those skilled in the art without separate description. And, the corresponding details shall be omitted from the following description for clarity of this disclosure.

Subsequently, while the audio play function is being executed, the video menu icon 403 is touched to execute another menu (e.g., a video menu) for example.

If so, referring to (6-3) of FIG. 6, the audio play function is stopped in the mobile terminal 100. The audio play function window 421 then disappears from the touchscreen 400.

Subsequently, a second audio play function icon 415 is displayed on the touchscreen 400. The second audio play function icon 415 is easily understandable from the description of the aforesaid first audio play function icon 411, of which details are omitted from the following description for clarity of this disclosure.

Referring to (6-4) of FIG. 6, a video play window 423 is displayed on the touchscreen 400 and the video play function is then executed.

In the following description, arrangements of the play function icons on the touchscreen 400 are explained with reference to FIG. 7 and FIG. 8.

Figure 7:
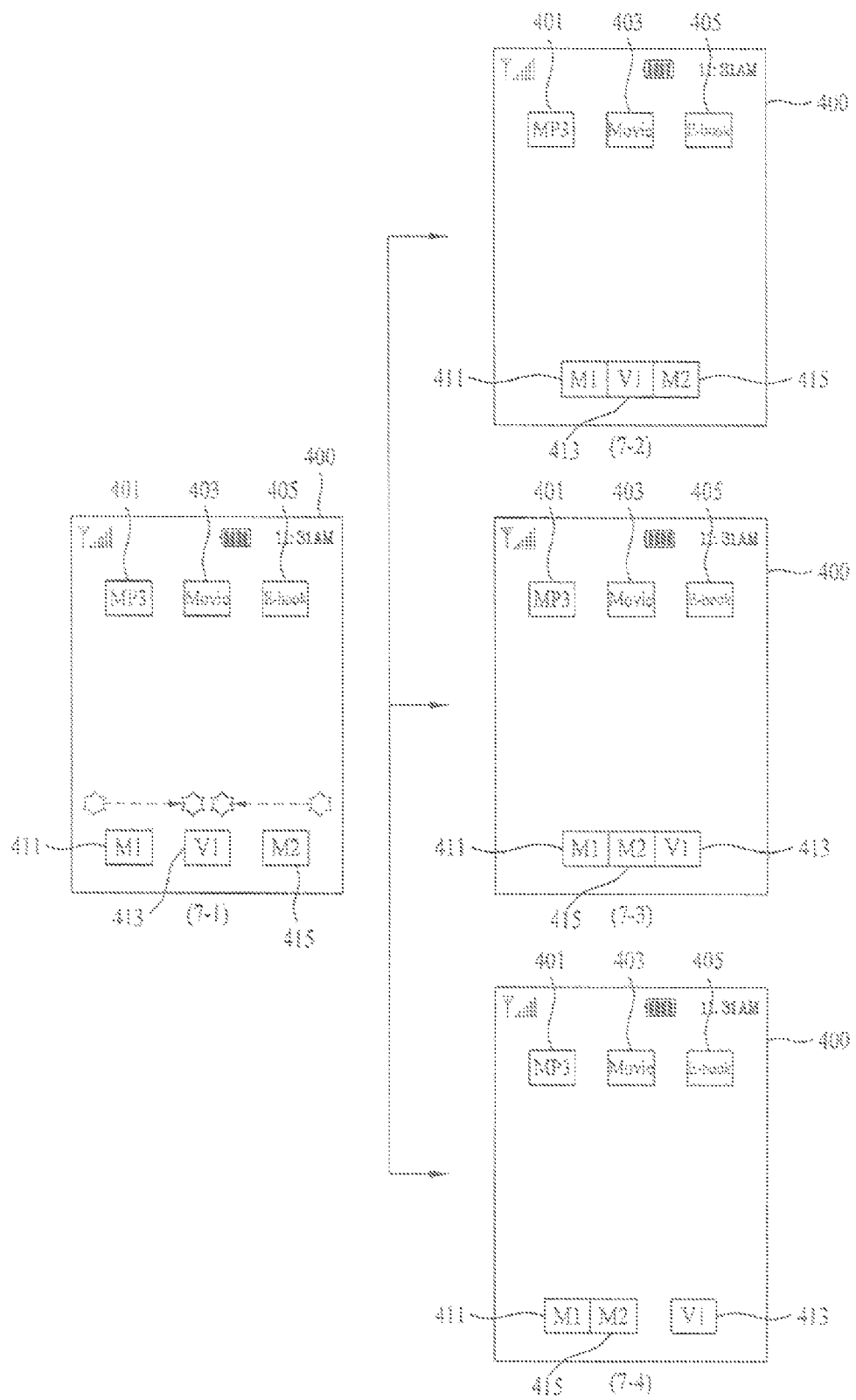

Referring to (7-1) of FIG. 7, the first audio play function icon 411, the video play function icon 413 and the second audio play function icon 415 are exemplarily displayed on the touchscreen 400 in a manner of being spaced apart from each other by a predetermined distance.

A touch gesture of a prescribed type is performed on the touchscreen 400. For example, the touch gesture of the prescribed type, as shown in (7-1) of FIG. 7, can be performed in a manner of touching two points of the touchscreen 400 with two fingers simultaneously and then dragging the fingers to get closer to each other.

If so, referring to (7-2) of FIG. 7, the three play function icons 411, 413 and 415 can be relocated in a manner of being adjacently positioned into one bundle.

When the three play function icons 411, 413 and 415 are relocated in a manner of being adjacently positioned into one bundle, play function icons in the same category, as shown in (7-3) of FIG. 3, can be arranged in a manner of being grouped to be discriminated from other categories. Referring to (7-3) of FIG. 7, when the three play function icons 411, 413 and 415 are relocated in a manner of being adjacently positioned into one bundle, the first and second audio play function icons 411 and 415 pertaining to the audio category are sorted together to be arranged by a sub-bundle within the corresponding bundle. Therefore, the first and second audio play function icons 411 and 415 are sorted to form the sub-bundle within the corresponding bundle and the play function icon (i.e., the video play function icon 413) pertaining to a different category is arranged adjacent to the sub-bundle.

It is not mandatory for the three play function icons 411, 413 and 415 to be arranged adjacent to each other as one bundle. Referring to (7-4) of FIG. 7, the play function icons pertaining to one category among the three play function icons 411, 413 and 415 can be arranged into a different bundle.

Even if the touch gesture of the prescribed type is not performed, if a prescribed number of play function icons are generated on the touchscreen 400, they can be configured in a manner of being automatically arranged adjacent to each other.

Meanwhile, when the play function icons are arranged adjacent to each other on the touchscreen 4000, if a touch gesture of a type different from that of the former gesture is performed, the play function icons are restored into the original formation, as shown in (7-1) of FIG. 7, to be arranged in a manner of being spaced from each other. The latter touch gesture of the different type can include a double click on the corresponding bundle. Alternatively, the latter touch gesture of the different type can be performed in a manner of touching two points of the touchscreen 400 with two fingers simultaneously and then dragging the two fingers to get farther from each other. The touch gesture of the different type is non-limited by the present invention.

When the play function icons 411, 413 and 415 are arranged adjacent to each other, it is not mandatory for the play function icons 411, 413 and 415 to be arranged in one row shown in FIG. 7. Optionally, the play function icons 411, 413 and 415 can be arranged in various styles. This is explained in detail with reference to FIG. 8 as follows.

Figure 8:
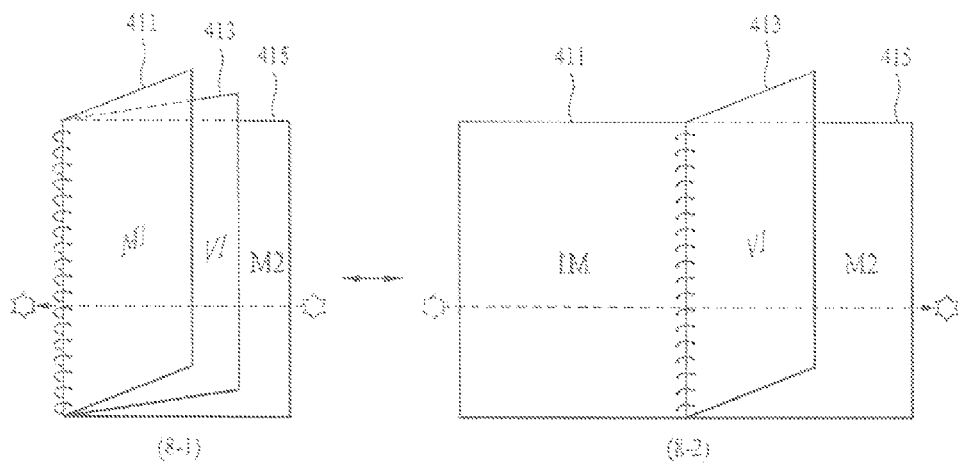

Referring to FIG. 8, the play function icons 411, 413 and 415 can be arranged adjacent to each other into a bundle of a spring note type.

Each time a touch & drag is performed on the bundle n one direction, the play function icons 411, 413 and 415, as shown in (8-2) of FIG. 8, can be turned over one by one in a direction of the touch & drag.

And, the following configuration is possible. First of all, if a touch is performed on the bundle, the play function icon (e.g., the first audio play function icon 411 shown in (8-1) of FIG. 8, the video play function icon 413 shown in (8-2) of FIG. 8) unfolded in a most front right side of the bundle is selected. A corresponding function is then executed.

The following description is made with reference to FIG. 9.

Referring to (9-1) of FIG. 9, a virtual polyhedron 500 can be displayed on the touchscreen 400. No limitation is put on the polyhedron 500. For instance, the polyhedron can include a square pillar or a trigonal prism. In (8-1) of FIG. 8, exemplarily shown is that one facet of the polyhedron, i.e., a first facet 510 is displayed in front direction on the touchscreen 400. The e-book menu icon 405 and the e-book play function icon 417 are exemplarily displayed on the first facet 510.

A user command for rotating the polyhedron 500 can be inputted via the user input unit 130. In this case, the user command can include a touch & drag in one direction on the touchscreen 400 for example.

If so, referring to (9-2) and (9-3) of FIG. 9, the polyhedron 500 is rotated. Accordingly, as the polyhedron 500 is rotated, another facet of the polyhedron 500, i.e., a second facet 520, as shown in (9-3) of FIG. 9, can be displayed. The audio menu icon 401, the video menu icon 403 and the audio play function icon 411 and the video play function icon 413 are exemplarily displayed on the second facet 520.

A touch gesture of a prescribed type for arranging the play function icons adjacent to each other can be performed on the touchscreen 400.

If so, referring to (9-4) of FIG. 9, the audio play function icon 411 and the video play function icon 413 on the second facet 510 and the e-book play function icon 417 provided to the first facet 510 can be adjacently arranged on the second facet 520.

Therefore, referring to (9-5) and (9-6) of FIG. 9, even if the polyhedron 500 is rotated again to display first facet 510 on the touchscreen 400, the e-book play function icon 417 used to be on the first facet 510 may not be displayed by being shifted to the second facet 520.

If play function icons exist on other facets except the first and second facets of the polyhedron 500, they can be included in the bundle by being shifted to the second facet 510.

FIG. 10 and FIG. 11 are described as follows.

Referring to (10-1) of FIG. 10, the second facet 520 of the polyhedron 500 is displayed on the touchscreen 400. The mobile terminal 100 is executing the audio play function and the audio play function window 421 is displayed on the second facet 520 of the polyhedron 500. On the second facet 520, the audio menu icon 401 and the video menu icon 403 are exemplarily displayed.

The video menu icon 403 is touched for example to execute the video menu in the course of executing the audio play function.

If so, referring to (10-2) of FIG. 10, the audio play function is stopped in the mobile terminal 100. The audio play function window 421 then disappears from the second facet 520 of the polyhedron 500.

Execution progress status information of the audio play function at the timing point of stopping the execution of the audio play function is stored in the memory 160. The audio play function icon 411 linked with the execution progress status information is generated and then displayed on the second facet 520 of the polyhedron 500. The audio play function icon 411 is explained in detail in the foregoing description, of which details are omitted from the following description.

Referring to (10-3) of FIG. 10, the video play window 423 is displayed on the second facet 520 of the polyhedron 500 and the video play function is executed.

While the video play function is being executed via the video play window 423 on the second facet 520, a different function can be played back on a different facet (e.g., the first facet 510) except the second facet 520 of the polyhedron 500. This is further explained with reference to FIG. 11 as follows.

Referring to (11-1) of FIG. 11, the video play function is executed in the mobile terminal 100 and the video play window 423 is being displayed on the second facet of the polyhedron 500.

Subsequently, a touch & drag can be inputted on one direction to rotate the polyhedron 500.

If so, referring to (11-2) and (11-3), the polyhedron 500 is rotated. Therefore, as the polyhedron 500 is rotated, the first facet of the polyhedron 500 can be displayed as shown in (11-3) of FIG. 11.

The e-book menu icon 405 is exemplarily being displayed on the first facet 510.

Even if the polyhedron 500 is rotated, the video play function can keep being executed via the video play window 423 on the second facet 520.

Subsequently, while the video play function is being executed, the e-book menu icon 405 is touched for example to execute the e-book menu. If so, referring to (11-4) of FIG. 11, the e-book viewer function is executed in the mobile terminal 100. And, the e-book viewer window 425 is being displayed on the first facet 510 of the polyhedron 500 displayed on the touchscreen 400.

Meanwhile, as the video play window 423 is located on the second facet 520 different from the first facet 510 of the polyhedron 500, the video play function may keep being executed irrespective of the execution of the e-book viewer function.

Therefore, referring to (11-5) and (11-6) of FIG. 11, after a touch & drag has been performed on the touchscreen 400 to rotate the polyhedron 500, even if the second facet 520 is displayed again, it can be observed that the video play function keeps being executed via the video play window 423 on the second facet 520.

FIG. 12 is described as follows.

Referring to (12-1) of FIG. 12, a user command for adjusting a size of the audio play window 423 can be inputted via the user input unit 160. For example, the user command for adjusting the size can include a touch & drag in one direction on the touchscreen 400.

If so, referring to (12-2) and (12-3) of FIG. 12, the size of the audio play window 423 gets smaller. As the size gets smaller, a first control region of the audio play window 423 disappears. Yet, second and third control regions of the audio play window 423 keep being played.

Subsequently, referring to (12-4) of FIG. 12, a touch & drag is performed one more time on the touchscreen 400 in one direction.

If so, referring to (12-5) and (12-6) of FIG. 12, the size of the audio play window 423 gets further smaller. As the size is reduced, the second control region of the audio play window 423 disappears. Yet, the third control region of the audio play window 423 keeps being displayed.

Besides, each time a touch & drag is performed in a direction opposite to the former direction on the touchscreen 400, the second and third control regions can be sequentially displayed again.

Accordingly, the present invention provides the following effects and/or advantages.

First of all, according to at least one of embodiments of the present invention, while a first function is being executed in a mobile terminal, if a second function different from the first function is executed, a first function icon having execution progress status information of the first function at a timing point of stopping the execution of the first function can be generated. If the first function is re-executed by selecting the first function icon later, it is advantageous in that the first function can be executed in a manner of being continuous with an execution progress status at the execution stop timing point.

It will be apparent to those skilled in the art that various modifications and variations can be specified into other forms without departing from the spirit or scope of the inventions.

For instance, the above-described methods can be implemented in a program recorded medium as computer-readable codes. The computer-readable media include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet). And, the computer can include the controller 180 of the terminal.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A mobile terminal comprising:
a touchscreen configured to display information; and
a controller configured to:
execute a first function and control the touchscreen to display a first function window;
automatically stop the execution of the first function at a first execution stop timing point in order to avoid multitasking of the first function and at least a second function upon newly executing a second function different from the first function while still executing the first function;
control the touchscreen to display a second function window upon newly executing the second function;
control the touchscreen to display a polyhedron including a first facet and a second facet such that the first function window is displayed on the first facet and the second function window is displayed on the second facet;

control the touchscreen to no longer display the first function window and to display a first function icon at the first execution stop timing point, the first function icon indicating execution progress status information related to the first function;

re-execute the first function upon selection of the first function icon such that execution of the first function is continuous from the first execution stop timing point; and control the touchscreen to display the first function window again and no-longer display the first function icon when the first function is re-executed.

2. The mobile terminal of claim 1, wherein the controller is further configured to automatically stop the execution of the second function at a second execution stop timing point upon execution of a third function and control the touchscreen to no longer display the second function window and to display a second function icon indicating second function execution progress status information at the second execution stop timing point.

3. The mobile terminal of claim 2, wherein the controller is further configured to:

control the touchscreen to display the first function icon adjacent to the second function icon if the first function and the second function are related to a same function category; and control the touchscreen to display the first function icon spaced apart from the second function icon if the first function and the second function are related to different function categories.

4. The mobile terminal of claim 1, wherein the controller is further configured to control the touchscreen to:

display a plurality of function icons including the first function icon, each of the plurality of function icons having a corresponding function category; and arrange the plurality of function icons according to the corresponding function category of each of the plurality of function icons.

5. The mobile terminal of claim 1, wherein the controller is further configured to control the touchscreen to:

display a plurality of function icons including the first function icon; and arrange the plurality of function icons such that they are adjacent to each other when a specific touch input is received via the touchscreen.

6. The mobile terminal of claim 1, wherein the controller is further configured to control the touchscreen to:

display a plurality of function icons including the first function icon; and arrange the plurality of function icons such that they are adjacent to each other if a number of the plurality of function icons is more than a specific number.

7. A method of controlling a mobile terminal, the method comprising:

executing a first function and displaying a first function window on a touchscreen;

newly executing a second function different from the first function while still executing the first function;

displaying a second function window on the touchscreen upon newly executing the second function;

displaying a polyhedron including a first facet and a second facet;

displaying the first function window on the first facet and the second function window on the second facet;

automatically stopping the execution of the first function at a first execution stop timing point in order to avoid multitasking of the first and second functions;

no longer displaying the first function window on the touchscreen;

displaying a first function icon on the touchscreen indicating execution progress status information related to the first function; and re-executing the first function upon selection of the first function icon such that execution of the first function is continuous from the first execution stop timing point.

8. The method of claim 7, further comprising displaying the first function window again and no longer displaying the first function icon when the first function is re-executed.

9. The method of claim 7, further comprising:

automatically stopping the execution of the second function at a second execution stop timing point upon execution of a third function;

no longer displaying the second function window on the touchscreen; and displaying a second function icon on the touchscreen indicating second function execution progress status information.

10. The method of claim 9, further comprising:

displaying the first function icon adjacent to the second function icon if the first function and the second function are related to a same function category; and displaying the first function icon spaced apart from the second function icon if the first function and the second function are related to different function categories.

11. The method of claim 7, further comprising:

displaying a plurality of function icons including the first function icon, each of the plurality of function icons having a corresponding function category; and arranging the plurality of function icons according to the corresponding function category of each of the plurality of function icons.

12. The method of claim 7, further comprising:

displaying a plurality of function icons including the first function icon; and arranging the plurality of function icons to be adjacent to each other when a specific touch gesture is received on the touchscreen.

13. The method of claim 7, further comprising:

displaying a plurality of function icons including the first function icon; and arranging the plurality of function icons to be adjacent to each other if a number of the plurality of function icons is more than a specific number.

* * * * *